(12) United States Patent
Yoshida et al.

(10) Patent No.: US 6,432,572 B1
(45) Date of Patent: *Aug. 13, 2002

(54) BATTERY VALVE AND BATTERY USING THE SAME

(75) Inventors: Hiroaki Yoshida; Takefumi Inoue; Hideki Masuda, all of Kyoto (JP)

(73) Assignee: Japan Storage Battery Co., Ltd., Kyoto (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,241

(22) Filed: Nov. 10, 1999

(30) Foreign Application Priority Data

Nov. 10, 1998 (JP) .............................. 10-318485

(51) Int. Cl.$^7$ ........................... H01M 2/12; H01M 10/40
(52) U.S. Cl. .............................. 429/56; 429/53; 429/94; 429/120
(58) Field of Search ........................... 429/53, 56, 120, 429/94, 176

(56) References Cited

U.S. PATENT DOCUMENTS

| | | | |
|---|---|---|---|
| 4,175,166 A | | 11/1979 | Rosansky .................... 429/56 |
| 5,639,571 A | * | 6/1997 | Waters et al. |
| 6,159,631 A | * | 12/2000 | Thompson et al. |

FOREIGN PATENT DOCUMENTS

| | | | |
|---|---|---|---|
| EP | 0 333 023 A1 | 9/1989 | ............ H01M/2/12 |

OTHER PUBLICATIONS

Japanese Abstract No. 10269998, dated Oct. 9, 1998.
Japanese Abstract No. 59154742, dated Sep. 3, 1984.
Japanese Abstract No. 01309253, dated Dec. 13, 1989.
European Search Report—Feb. 2000.

* cited by examiner

Primary Examiner—John S. Maples
(74) Attorney, Agent, or Firm—Sughrue Mion, PLLC

(57) ABSTRACT

A cell has a winding type power generating element, a cell case for housing the winding type power generating element therein and a safety valve formed at the lower end of the side wall of the cell.

9 Claims, 15 Drawing Sheets

BATTERY VALVE AND BATTERY USING THE SAME

BACKGROUND OF THE INVENTION

1. Field of the Invention

The present invention relates to a battery cell such as a nonaqueous electrolytic secondary cell in which a winding-type power-generating element is housed within a cell case, and a battery (multiple-cell set) using it.

2. Description of the Related Art

An explanation will be given of a conventional structure of a large-scale large-capacity elliptic-cylindrical nonaqueous secondary cell 1. As seen from FIG. 19, a power generating element 2 of the nonaqueous secondary cell is composed of a belt-shaped electrolytic positive electrode 2a and a belt-shaped negative electrode 2b which are wound in an elliptic-cylinder through belt-shaped separators 2c. The positive electrode 2a has an area of a mixture 2d of an active material and binder for the positive electrode applied on the surface of an aluminum foil and another area on which the mixture 2d is not applied and to which the aluminum foil is exposed at the belt-shaped lower end of the foil. The negative electrode 2b has an area of a mixture 2e of an active material and binder for the negative electrode applied on the surface of a copper foil and another area on which the mixture 2e is not applied and to which the copper foil is exposed at the belt-shaped upper end of the foil. These positive electrode 2a and a negative electrode 2b are wound in a manner displaced horizontally little by little so that the lower end of the positive electrode 2a protrudes downward and the upper end of the negative electrode 2b protrudes upward.

As seen from FIG. 20, a negative electrode collector 9 is fixedly connected to the upper end of the negative electrode 2b of the power generating element 2 which protrudes upwards. The negative electrode collector 9 is made by stamping a copper alloy plate and folded to form slits. The copper foils exposed to the upper ends of the negative electrodes 2b are inserted in and fixedly connected to the respective slits by clamping or welding. A negative electrode terminal 5 of a copper alloy is fixedly connected to the negative electrode collector 9 by clamping or welding so that it protrudes upward. A positive electrode collector 8 is fixedly connected to the lower end of the positive electrode 2a of the power generating element 2 which protrudes downwards. The positive electrode collector 8 is made by stamping an aluminum alloy plate and folded to form slits. The aluminum foils exposed to the lower ends of the positive electrodes 2a are inserted in and fixedly connected to the respective slits by clamping or welding. The one end of the positive electrode collector 8 is extended to the negative electrode collector 9 along the power generating element 2 to reach the upper side thereof. A positive electrode terminal 4 of the aluminum alloy is fixedly connected to the positive electrode collector 8 by clamping or welding.

The power generating element 2 to which the positive electrode collector 8 and the negative electrode collector 9 are connected is housed within a cell case 3 as shown in FIG. 21. The cell case 3 is made of an aluminum alloy plate or stainless steel plate, and is composed of an elliptic-cylindrical vessel-shaped case body 3a and an elliptic cover plate 3b fit in the upper opening thereof and sealed by welding on the periphery. The positive electrode terminal 4 and negative electrode terminal 5 which are fixedly connected to the power generating element 2 are caused to protrude upwards through the opening holes located at two positions of the cover plate 2 from the inside of the cell case 3. These electrode terminals 4 and 5 are electrical insulating sealed by forming a glass hermetic seal in gaps between themselves and the opening holes. Incidentally, a metallic ring made of the same material as the cover plate 3b is electrical insulating secured to each of these positive electrode terminal 4 and negative electrode terminal 5 by a glass. hermetic seal or ceramic hermetic seal. These metallic rings are secured to seal the opening holes at two positions of the cover plate 3b. The cover plate 3b, thereafter, is fit in the case body 3a and sealed therein by welding.

The nonaqueous electrolytic secondary cell 1 is accompanied by the following danger. Namely, when the power generating element 2 is heated excessively while abnormality occurs, the electrolyte is decomposed to generate gas. Then, the inside pressure is boosted so that the cell case 3 may be broken. In order to overcome such an inconvenience, in the conventional art, safety valves 6 were formed on the bottom of the case body 3a and on the cover plate 3b. The safety valves 6 are constructed by the plate areas thinned by forming grooves in the aluminum alloy plate or stainless steel plate constituting the case body 3a and cover plate 3b. When the pressure within the cell case 3 is boosted abnormally, the grooved thin plate areas are broken so that the inside of the cell case is degassed.

Now, it should be noted that the gas generated in the power-generating element 2 can move only toward either the upper end or lower end along a winding axis direction because the positive electrode 2a and negative electrode 2b are closely wound. In order to avoid such an inconvenience, safety valves 6 are formed on the bottom of the case body 3a and on the cover plate 3b so that the gas moved out from the upper and lower ends in the winding axis direction can be smoothly discharged externally. However, where such an elliptic-cylindrical nonaqueous electrolytic secondary cell 1 is used as a single cell, when the internal pressure increases, the planar portion of the side wall of the case body 3a swells outwardly. Therefore, for example, the gas moved out from the lower end of the power-generating element 2 can be transferred to the upper end through the swelled side of the case body 3a. In this case, the safety valve 6 may be formed on only the cover plate 3b at the upper end. However, where a plurality of the nonaqueous electrolytic secondary cells 1 are closely arranged so that they can be used as a battery, the planar portions of the sides of the adjacent nonaqueous electrolytic secondary cells push each other so that each battery cannot swell by the internal pressure unlike the case of the single cell. Thus, the gas moved out from the lower end of the power generating element 2 cannot shift. In this case, the safety valve 6 must be also formed on the bottom of the case body 3a.

Where the conventional nonaqueous electrolytic secondary cell 1 is used as a constituent of the battery, it cannot be used with the bottom of the cell where the safety valve 6 is formed being closed. For example, in the case of the battery for a special use such as aeronautics/space, as shown in FIG. 22, a cooling plate 7 of a material having a high thermal conductivity such as an aluminum alloy is arranged between the plurality of nonaqueous electrolytic secondary cells 1 and beneath the bottom of each nonaqueous secondary cell so that the battery can be cooled by a cooling means (not shown). In this case, the planar portion of the side of each nonaqueous secondary cell 1 is restrained by the cooling plate 7 and hence cannot swell. This requires for the safety valve to be formed on the bottom of the case body 3a.

However, because the bottom of the case body 3a is also blocked by the cooling plate 7, the safety valve 6 cannot operate normally.

Even where the nonaqueous electrolytic secondary cell 1 is used as a single cell, if the side wall of the case body 3a cannot swell because the cell is arranged with no gap within an installing space, the safety valve 6 must be formed on the bottom of the case body 3a. In this case also, the cell must be used with the bottom of the cell where the safety valve 6 is formed being not closed.

In the case of the cylindrical nonaqueous electrolytic secondary cell, the entire side wall of the cell case is curved and has no planar portion. Therefore, even where it is arranged within an sufficient installing space as a single cell, the side wall of the cell cannot swell. In this case also, the safety valves must be formed on the upper and lower face of the cell case, and hence the cell cannot be used with the bottom of the cell where the safety valve 6 is formed being closed.

Such a problem applies to not only the nonaqueous electrolytic secondary cell, but also all the batteries which require a safety valve and use a winding type power-generating element.

SUMMARY OF THE INVENTION

The present invention has been accomplished in order to solve such a problem, and it is an object of the present invention to provide a battery which is provided with a safety valve on the side wall of a cell case in the vicinity of a bottom thereof so that the cell can be used with the bottom being closed, and a battery using such a cell.

According to the first aspect of the present invention, in a cell in which a winding type power generating element is housed within a cell case, on a side wall of the cell case along a winding axis direction of the power generating element, a safety valve is formed at a position inclusive of the tip end of a mixture-applied area of at least one electrode of the power generating element.

In accordance with the first aspect of the present invention, since the safety valve is formed at at least one end of the side wall of the cell case, even where the one end surface of the battery is closed, the gas moved out from the one end of the winding type power generating element can be smoothly discharged externally. The safety valve may be formed at each of both ends of the side wall of the cell case.

According to the second aspect of the present invention, in a battery in which an elliptic-cylindrical winding type power generating element is housed within an elliptic-cylindrical cell case, on an elliptic-cylindrical curved surface of a side wall of the cell case along a winding axis direction of the power generating element, a safety valve is formed at a position inclusive of the tip end of a mixture-applied area of at least one electrode of the power generating element.

In accordance with the second aspect of the present invention, since the safety valve is formed at the curved portion of the elliptic-cylindrical cell case, even where the planar portion of the side wall is restrained so that it cannot swell, the inner gas can be smoothly discharged horizontally.

According to the third aspect of the present invention, in the battery of the first or second aspect, the height of the cell along its side wall is 1.5 times or more as large as the narrowest width of the cell case.

In accordance with the third aspect of the present invention, since the length of the power generating element in the winding direction along the side wall of the cell case is sufficiently longer than the width thereof, the gas that may not escape at the one side of the cell case if there is no safety valve can be surely discharged externally from the safety valve formed on the side wall.

According to the fourth aspect of the present invention, in a battery, a plurality of the cells defined in any of the first to the third aspect of the present invention are arranged with the tip end located on their bottom side, and a cooling plate is arranged on their bottom side and between adjacent cells.

In accordance with the fourth aspect of the present invention, even where the side and bottom of the cell case of each of the batteries are blocked by the cooling plate of the battery, since the safety valve is formed at the bottom side of the side wall of each cell case, the gas move out from the bottom of the winding type power generating element can be smoothly discharged externally.

PREFERRED EMBODIMENTS OF THE INVENTION

Figure 1:
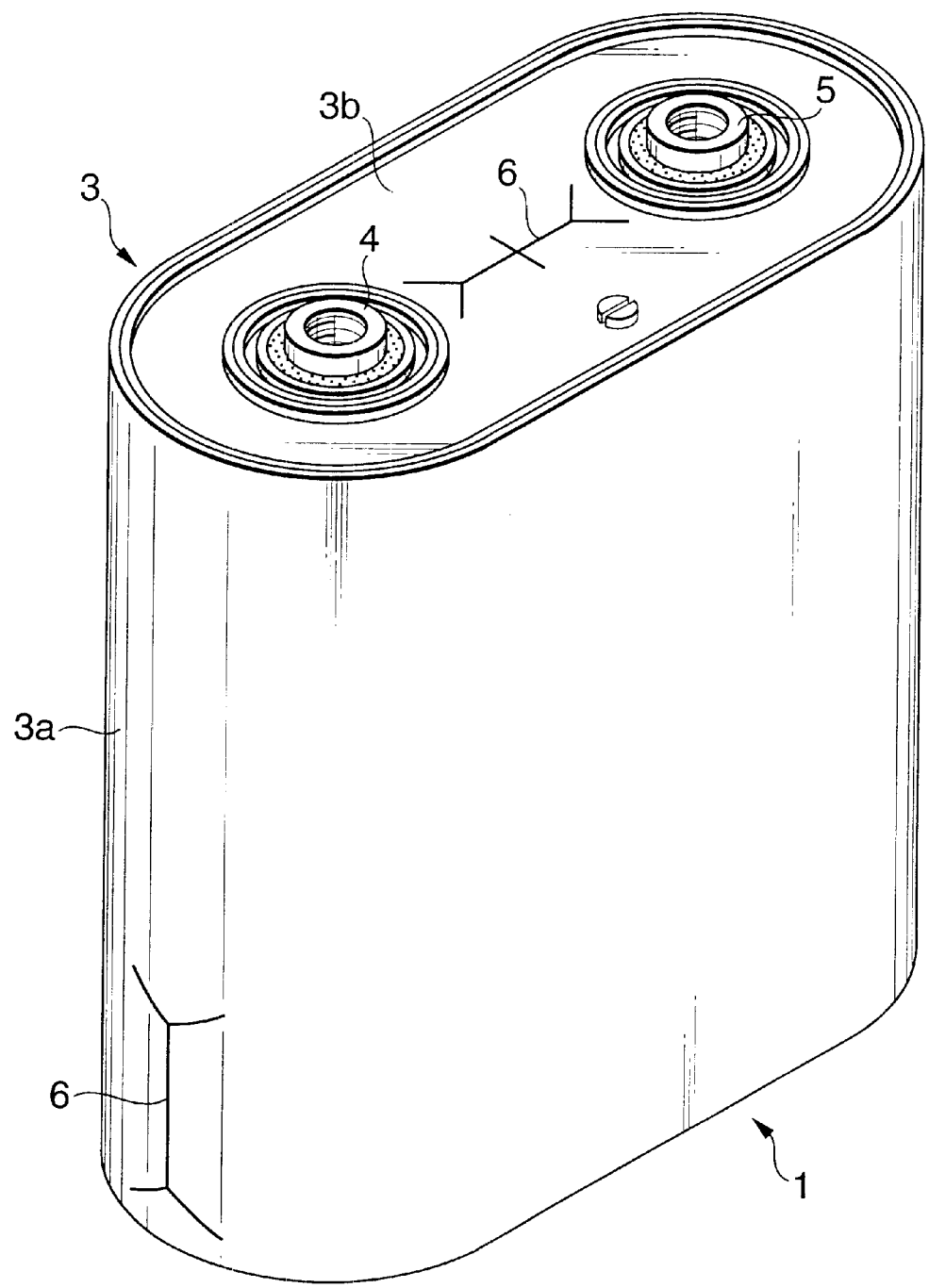
FIG. 1 is an overall perspective view of an nonaqueous electrolytic battery according to an embodiment of the present invention.

Now referring to the drawings, an explanation will be given of embodiments of the present invention.

Figure 2:
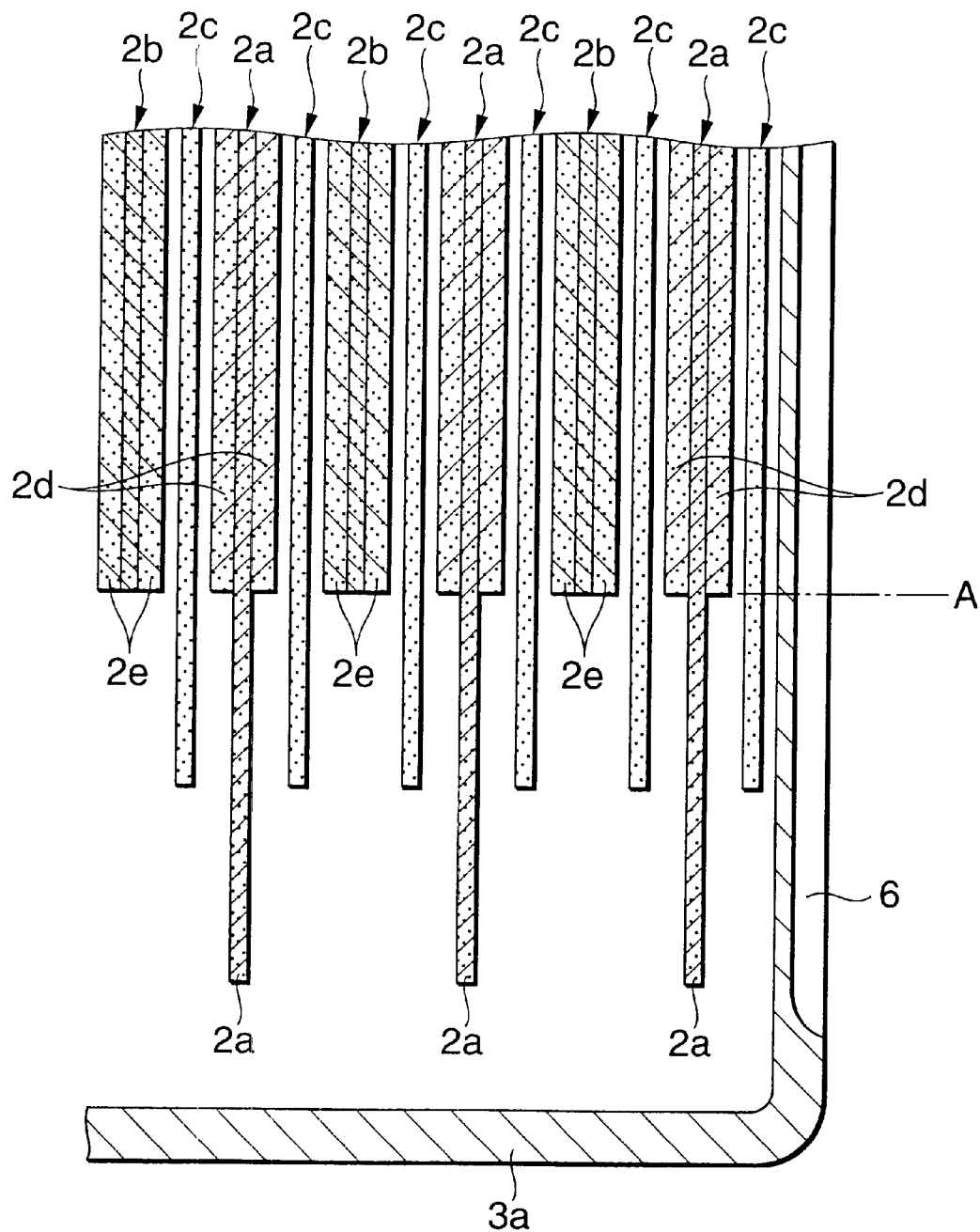
FIG. 2 is a partially enlarged longitudinal sectional view showing a structure in the vicinity of the lower end of the nonaqueous secondary cell.
Figure 3:
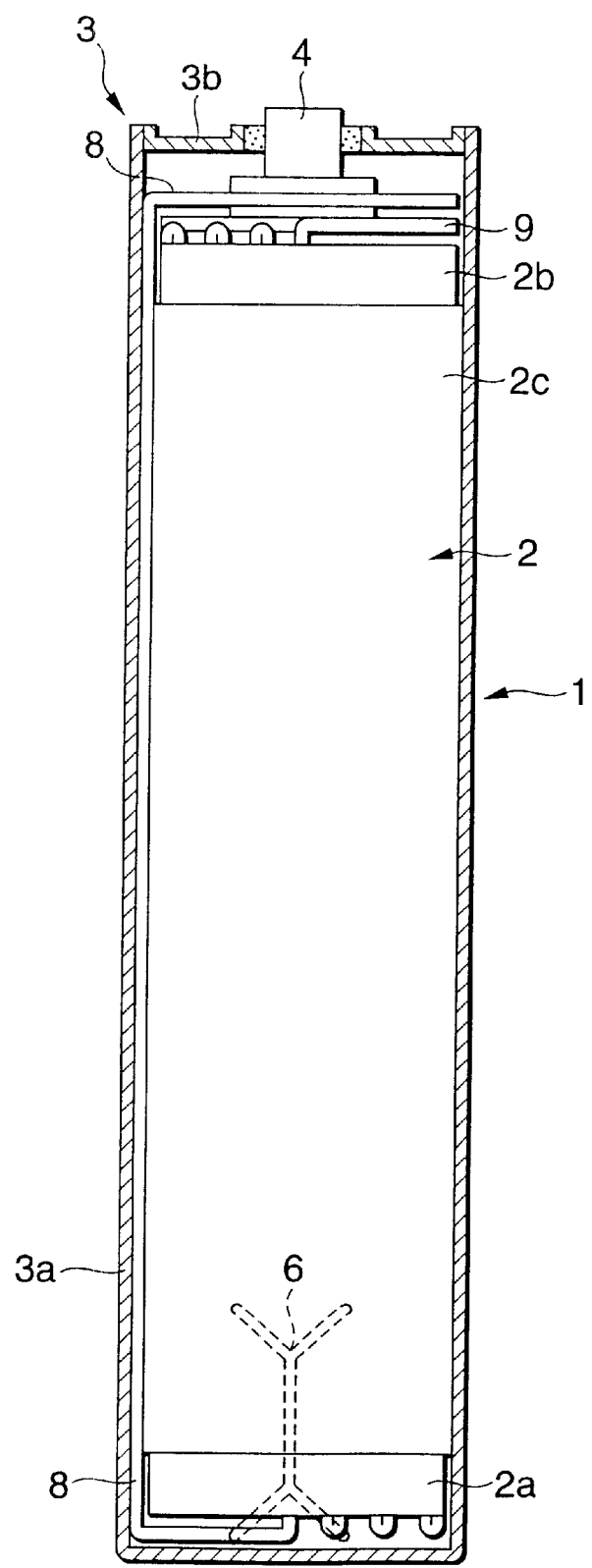
FIG. 3 is a longitudinal sectional view showing an internal structure of the nonaqueous electrolytic secondary cell according to an embodiment of the present invention.
Figure 4:
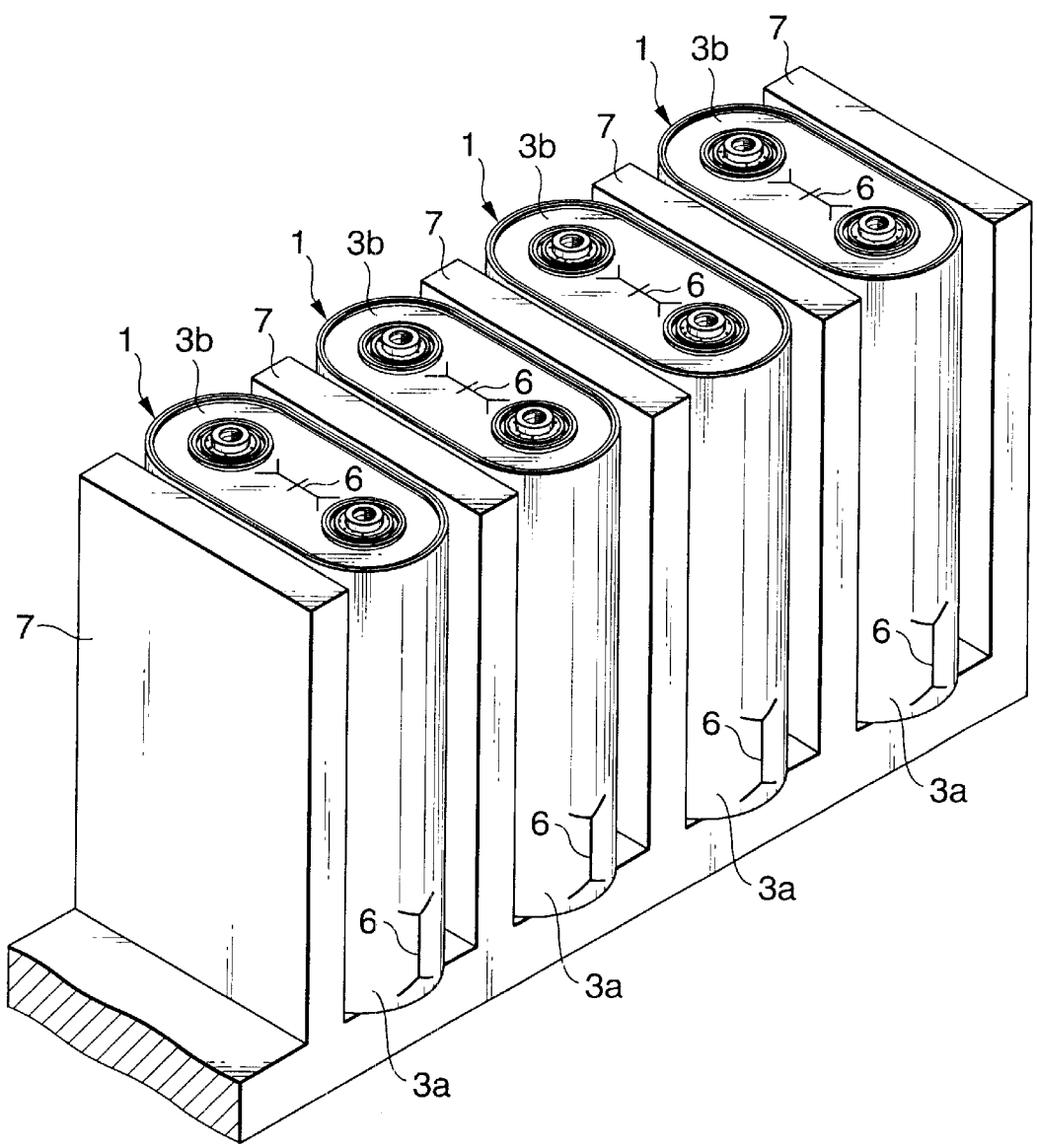
FIG. 4 is a perspective view of a battery composed of a plurality of nonaqueous electrolytic secondary cells according to an embodiment.

FIGS. 1 to 4 show a first embodiment of the present invention. Specifically, FIG. 1 is an overall perspective view of an nonaqueous electrolytic cell. FIG. 2 is a partially enlarged longitudinal sectional view showing a structure in the vicinity of the lower end of the nonaqueous secondary cell. FIG. 3 is a longitudinal sectional view showing an internal structure of the nonaqueous electrolytic secondary cell. FIG. 4 is a perspective view of a battery composed of a plurality of nonaqueous electrolytic secondary cells. In FIGS. 1 to 4, the same reference numerals refer to the same elements in the conventional arts shown in FIGS. 19 to 22.

Figure 19:
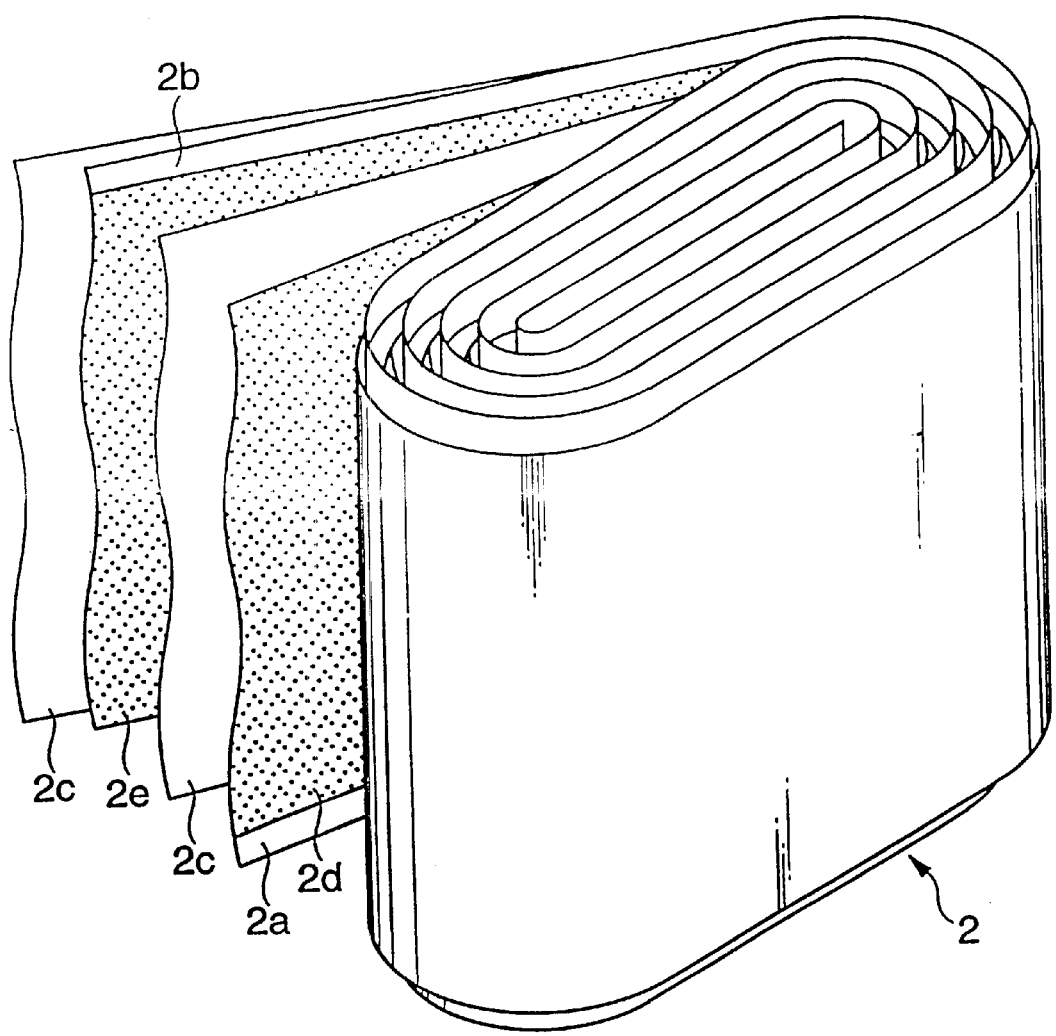
FIG. 19 is a perspective view showing the structure of a power generating element according to a conventional art.
Figure 20:
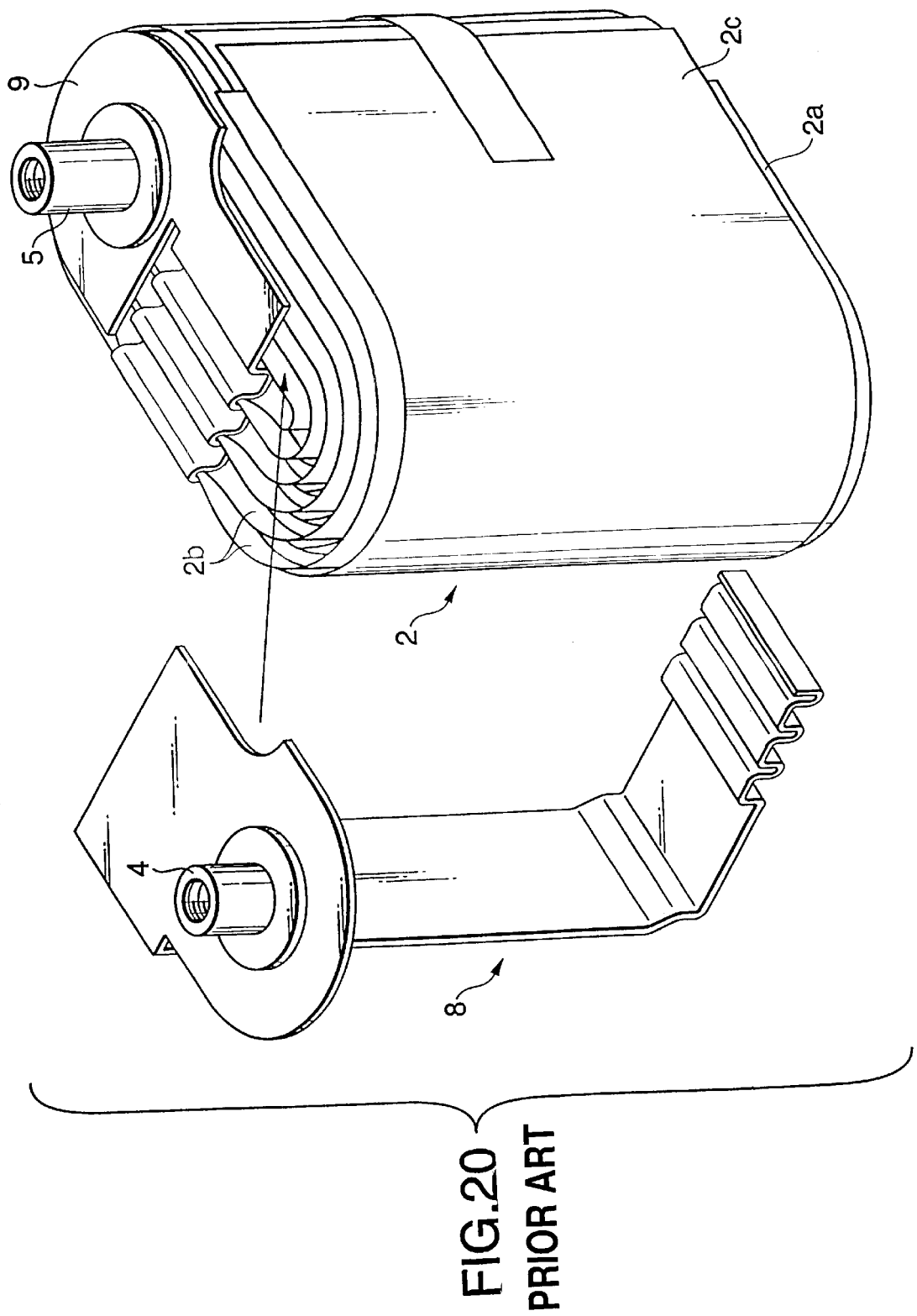
FIG. 20 is a perspective view of a structure of a power generating element, electrode collectors and terminals.
Figure 21:
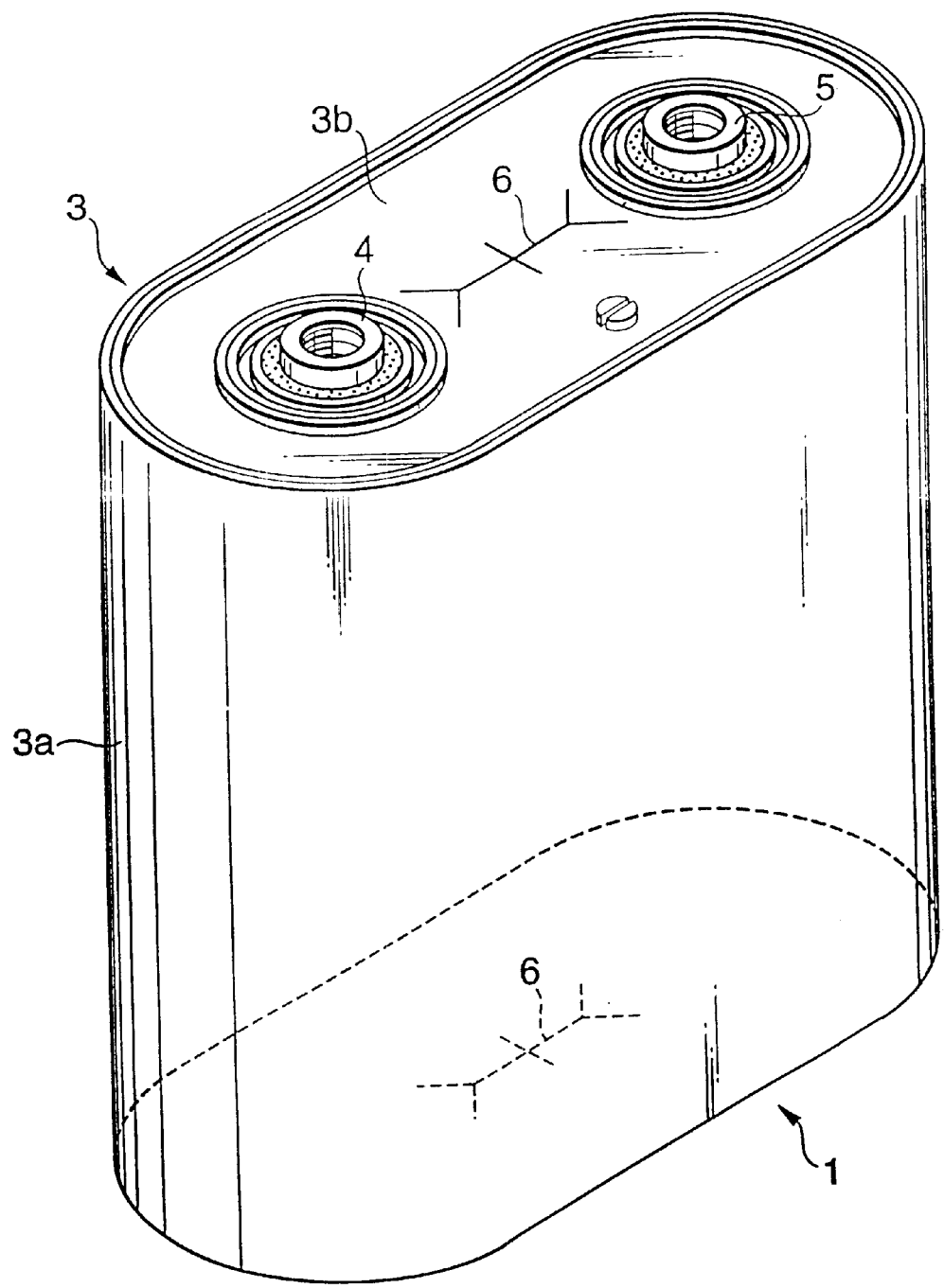
FIG. 21 is an overall perspective view of a nonaqueous electrolytic secondary cell according to another conventional art.
Figure 22:
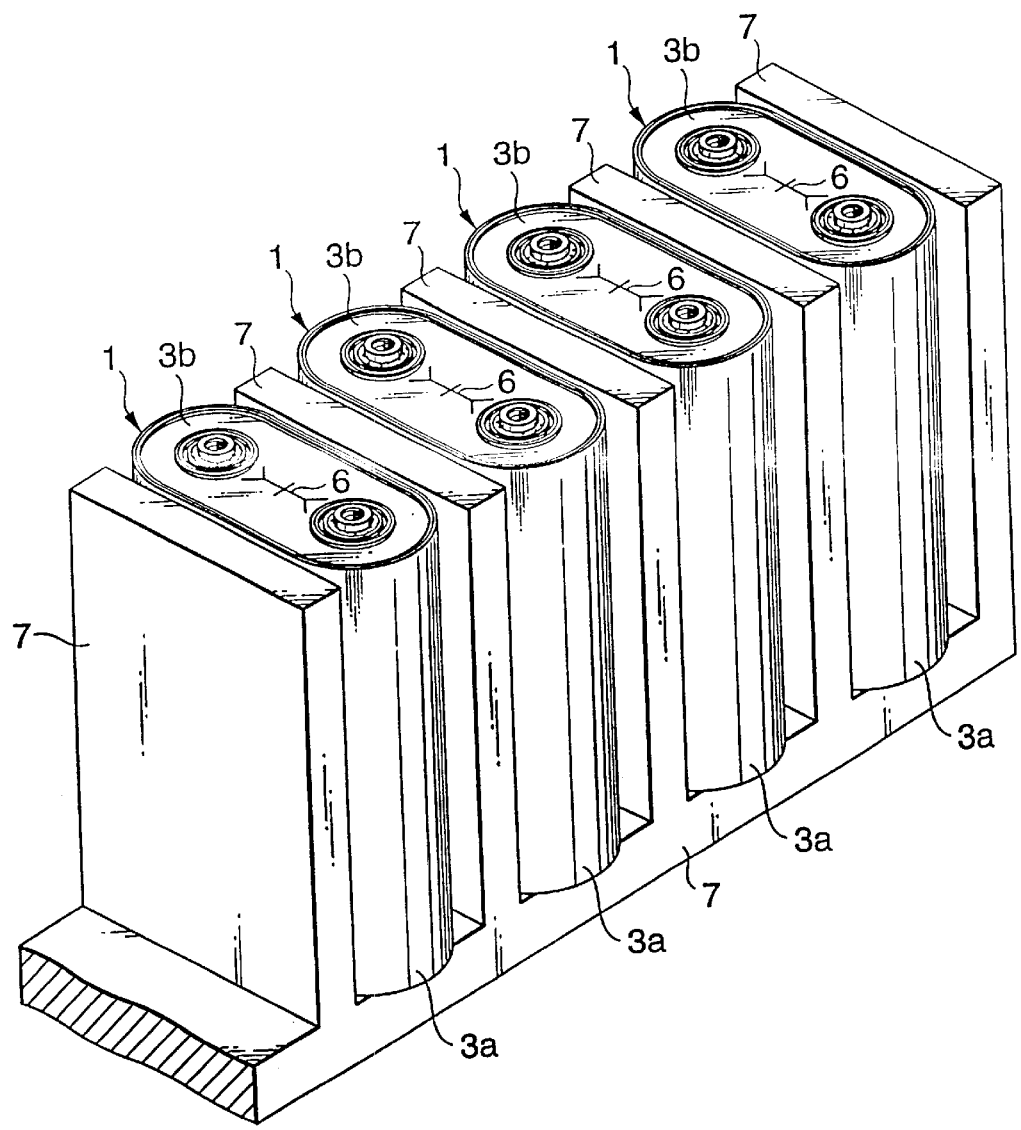
FIG. 22 is a perspective view of nonaqueous electrolyte secondary cell arranged in parallel according to another conventional art.

This embodiment will be explained in connection with a nonaqueous electrolytic secondary cell 1 provided with a power generating element 2 which is wound in an elliptic-cylindrical shape like the conventional arts as shown in FIGS. 19 to 22. As seen from FIG. 1, a cell case body 3 of the nonaqueous electrolytic secondary cell 1 is made from an aluminum alloy plate or stainless plate, and is composed of an elliptic-cylindrical vessel-shaped case body 3a and an elliptic cover plate 3b fit in the upper opening thereof and sealed on its periphery by laser welding or TIG welding. The power generating element 2 as shown in FIGS. 19 to 20 is housed within the cell case 3. The positive electrode terminal 4 and negative electrode terminal 5 which are fixedly connected to the power generating element 2 are caused to protrude upwards through the opening holes located at two positions of the cover plate 3b. These electrode terminals 4 and 5 are dielectrically sealed by forming a glass hermetic seal. Incidentally, these positive electrode terminal 4 and negative electrode terminal 5 can be dielectrically fixedly sealed in the cover plate 3b by means of a ceramic hermetic seal or screwing a packing material of synthetic resin as well as the glass hermetic seal.

The cover plate 3b has a safety valve formed at its central area like the conventional art. The case body 3a has another safety valve 6 formed at the lower end of its curved side wall. These safety valves 6 are constructed by the plate areas thinned by forming grooves in the aluminum alloy plate or stainless steel plate constituting the case body 3a and cover plate 3b. These grooves can be formed by means of cutting, stamping or etching. In the case of cutting, a machine capable of cutting a curved surface such as a three-dimensional NC is required. In the case of stamping, the groove can be formed simultaneously when the case body 3a is drawn and the cover plate 3b is stamped out. However, normally, after these machining operations, the groove is formed so as to print a stamp using a mold having a protrusion along the groove. In the case of etching, the other surface area of case body 3a and cover plate 3b than the area where the grooves are to be formed are covered with a protection film. Thereafter, the grooves are formed by thinning the metallic plate through chemical reaction of an etching solution. Because of the presence of these safety valves 6, when the pressure within the cell case 3 is boosted abnormally, the thin plate groove areas are broken so that the inside of the cell case is degassed.

The safety valve 6 to be formed on the side wall of the case body 3a is formed so that the lower end of the groove is lower than the lower end position A of the area where the mixture 2d of the positive electrode 2a and mixture 2e of the negative electrode 2b are applied in the power generating element 2. As shown in FIG. 3, since the positive electrode collector 8 for fixing the lower end of the positive electrode 2a is arranged beneath the power generating element 2, a gap is formed between itself and the bottom of the case body 3a. Therefore, the gas moved out from the lower end of the power generating element 2 can reach the lower end of the side wall through the above gap. Thus, if the groove of the safety valve 6 of the case body 3a is formed to reach the lower level than the lower end of the power generating element 2, even if the safety valve 6 is not formed on the bottom of the case body 3a, the gas can be smoothly discharged externally from the lower end of the side wall of the case body 3a. Further, in the power generating element 2, the separator 2c and the area of the positive electrode 2a where the mixture 2d is not applied to expose the aluminum foil and the area of the negative electrode 2b where the mixture 2e is not applied to expose the copper foil do not have rigidity but some flexibility. Therefore, the high pressure gas can push away them to move. Thus, it is not required that the groove of the safety valve 6 of the case body 3a is formed at the lower end of the power generating element 2. Instead of this, the groove has only to be formed to reach the lower level than the lower end position A of the area where the mixture 2d and mixture 2e are applied in the power generating element 2 as shown in FIG. 2.

In the nonaqueous electrolytic secondary cell 1 having the above configuration, even if the side wall of the cell case 3 is restrained and the bottom of the cell case 3 is blocked, while abnormality occurs, the gas moved out from the lower end of the power generating element 2 can be smoothly discharged externally from the safety valve formed on the side wall of the case body 3a. Where the length of the power generating element 2 is relatively short in the direction of winding, the gas generated within the power generating element 2 can be discharged from the upper end of the cell case 3a. For this reason, the present invention is particularly efficient for the nonaqueous electrolytic secondary cell 1 having a height that is 1.5 time or more as large as the smaller width of the elliptic cylindrical shape, or the diameter of the cylindrical shape.

In this embodiment, as shown in FIG. 4, a plurality of the nonaqueous electrolytic secondary cells 1 are arranged to constitute a battery. A cooling plate 7 is closely arranged between the adjacent nonaqueous electrolytic secondary cells and beneath the bottoms of these cells. In this case, the planar portion of the side wall of each of the nonaqueous electrolytic secondary cells 1 is restrained by the cooling plate 7 and cannot swell. Therefore, when abnormality occurs, it is impossible to shift the gas moved out from the lower end of the generating element 2 to the outer end thereof and externally discharge the gas from the safety valve formed on the cover plate 3b. Since the bottom of the case body 3a is also blocked by the cooling plate 7, the safety valve 6 cannot be formed there. However, in the nonaqueous electrolytic secondary cell 1 according to this embodiment, the safety valve 6 is formed at the lower end of the curved side wall of the case body 3a so that the high pressure gas can be externally discharged from the safety valve 6 through the gap at the bottom of the case body 3a.

Figure 5:
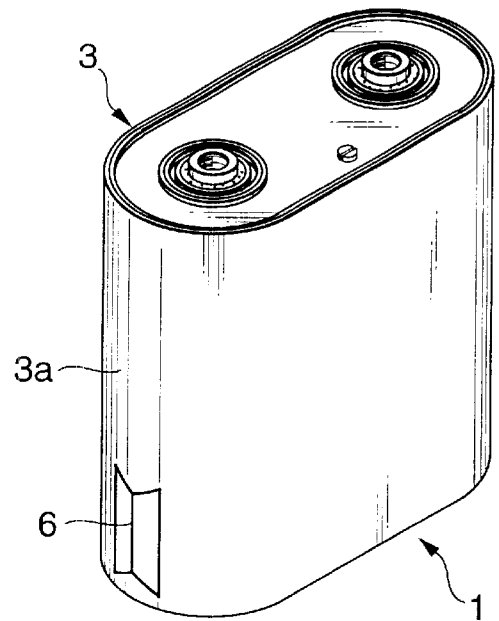
FIG. 5 is an overall perspective view of a nonaqueous secondary cell showing a second example of a groove shape of a safety valve according to an embodiment of the present invention.
Figure 6:
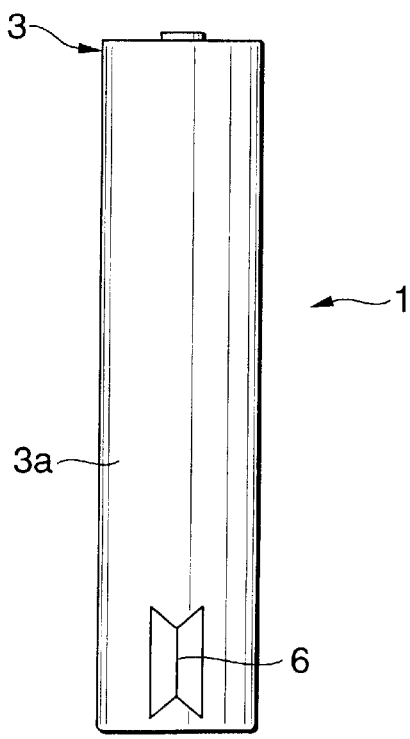
FIG. 6 is a side view of a nonaqueous secondary cell showing a second example of a groove shape of a safety valve according to an embodiment of the present invention.
Figure 7:
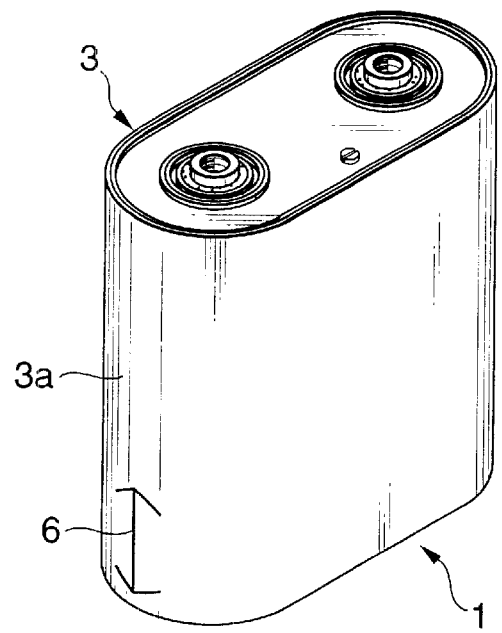
FIG. 7 is an overall perspective view of a nonaqueous secondary cell showing a third example of a groove shape of a safety valve according to an embodiment of the present invention.
Figure 8:
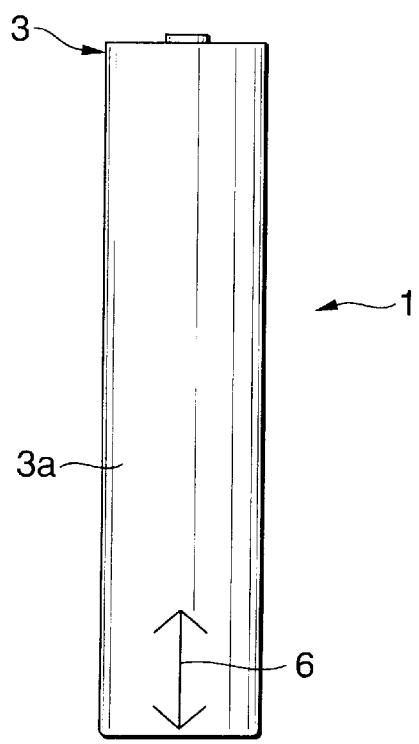
FIG. 8 is a side view of a nonaqueous secondary cell showing a third example of a groove shape of a safety valve according to an embodiment of the present invention.
Figure 9:
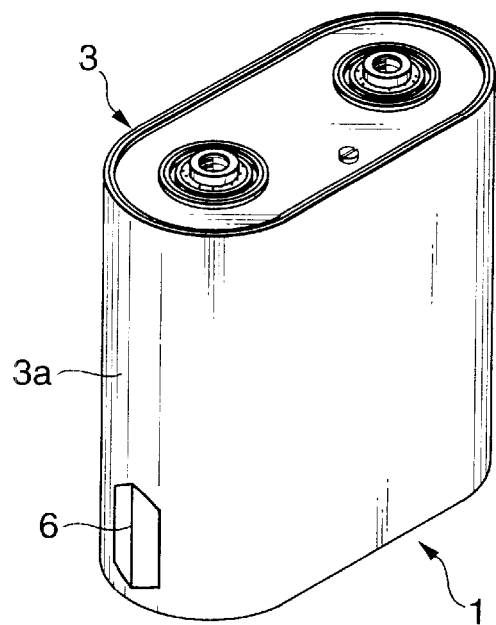
FIG. 9 is an overall perspective view of a nonaqueous secondary cell showing a fourth example of a groove shape of a safety valve according to an embodiment of the present invention.
Figure 10:
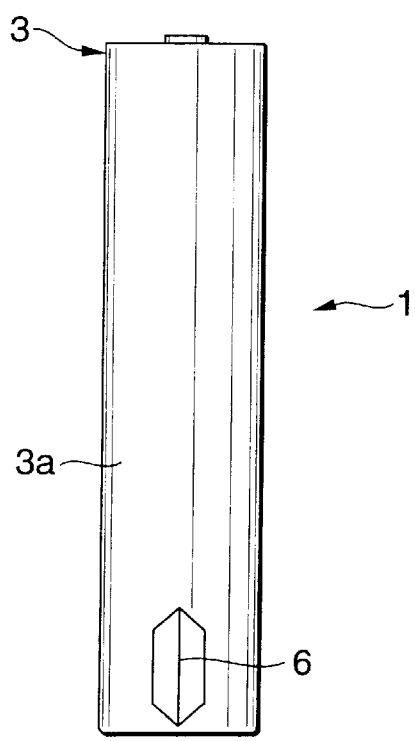
FIG. 10 is a side view of a nonaqueous secondary cell showing a fourth example of a groove shape of a safety valve according to an embodiment of the present invention.
Figure 11:
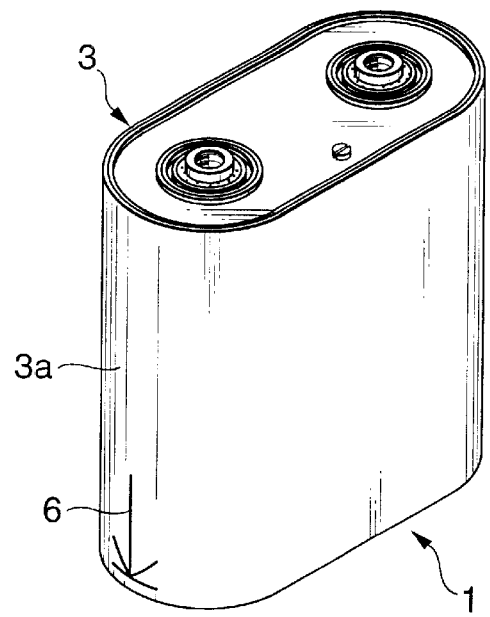
FIG. 11 is an overall perspective view of a nonaqueous secondary cell showing a fifth example of a groove shape of a safety valve according to an embodiment of the present invention.
Figure 12:
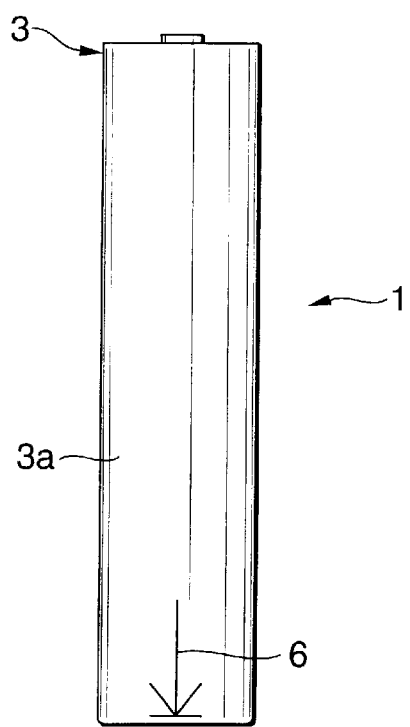
FIG. 12 is a side view of a nonaqueous secondary cell showing a fifth example of a groove shape of a safety valve according to an embodiment of the present invention.
Figure 13:
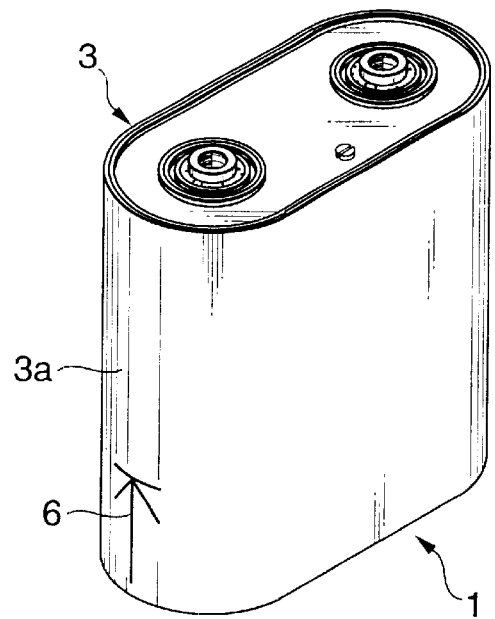
FIG. 13 is an overall perspective view of a nonaqueous secondary cell showing a sixth example of a groove shape of a safety valve according to an embodiment of the present invention.
Figure 14:
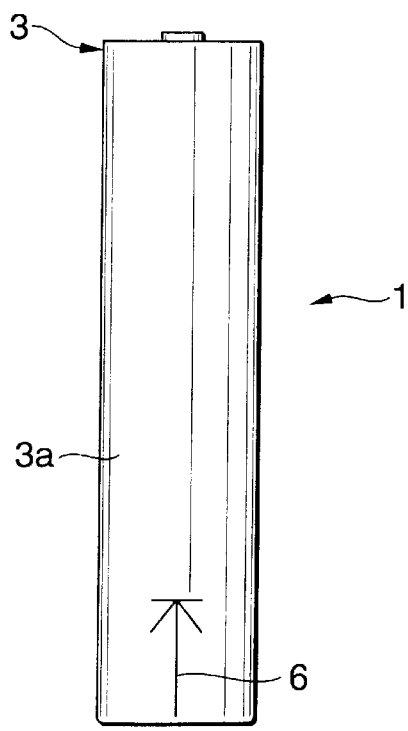
FIG. 14 is a side view of a nonaqueous secondary cell showing a sixth example of a groove shape of a safety valve according to an embodiment of the present invention.
Figure 15:
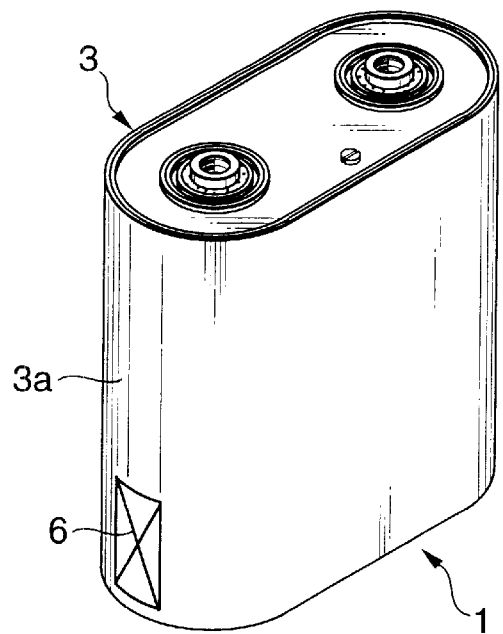
FIG. 15 is an overall perspective view of a nonaqueous secondary cell showing a seventh example of a groove shape of a safety valve according to an embodiment of the present invention.
Figure 16:
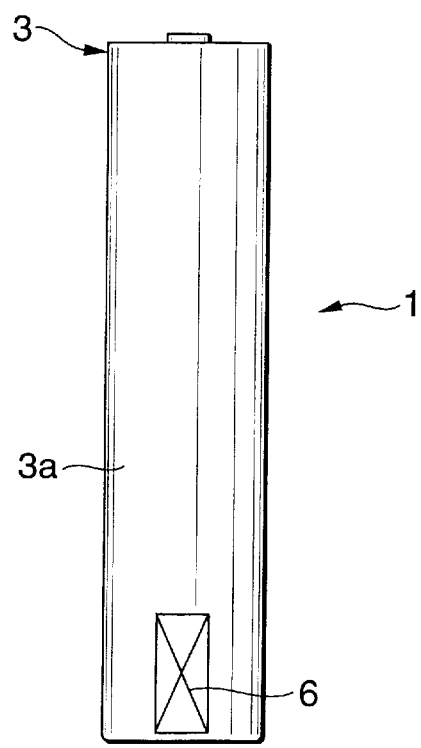
FIG. 16 is a side view of a nonaqueous secondary cell showing a seventh example of a groove shape of a safety valve according to an embodiment of the present invention.
Figure 17:
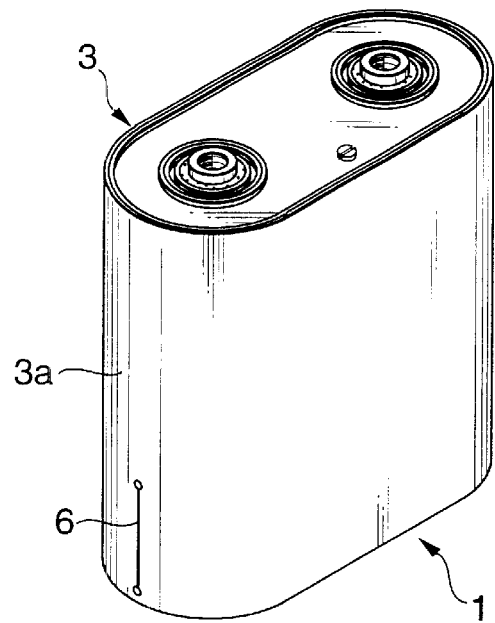
FIG. 17 is an overall perspective view of a nonaqueous secondary cell showing an eighth example of a groove shape of a safety valve according to an embodiment of the present invention.
Figure 18:
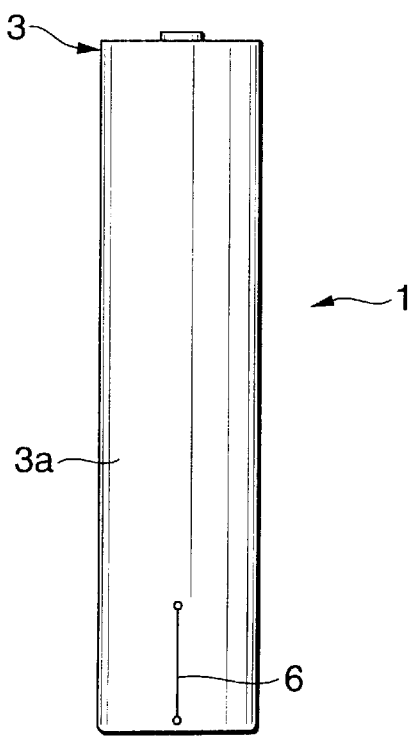
FIG. 18 is a side view of a nonaqueous secondary cell showing an eighth example of a groove shape of a safety valve according to an embodiment of the present invention.

In this embodiment, the safety valve 6 was formed to have a groove shape of a vertical connection of a "Y" groove and an inverted "Y" groove as a first example. However, the groove shape should not be limited to such a shape in this example as long as it can be surely broken under prescribed pressure or higher. For example, the following shapes of the safety valve 6 can be proposed. In the second example as shown in FIGS. 5 and 6, two vertical grooves are formed on both sides of the vertical connection of a "Y" groove and an inverted "Y" groove. In the third example as shown in FIGS. 7 and 8, the groove shape is formed in a vertical connection of an upward arrow groove and downward arrow groove. In the fourth example as shown in FIGS. 9 and 10, two vertical grooves are formed on both sides of the vertical connection of an upward arrow groove and a downward arrow groove as shown in FIGS. 7 and 8. In the fifth example as shown in FIGS. 11 and 12, the groove shape is composed of a groove of a downward arrow and a horizontal groove connected to the lower end thereof. In the sixth example as shown in FIGS. 13 and 14, the groove shape is composed of an upward arrow groove and a horizontal groove connected to the upper end thereof. In the seventh example as shown in FIGS. 15 and 16, the groove shape is composed of a square groove and diagonal line grooves added thereto. In the eighth example as shown in FIGS. 17 and 18, the groove shape is composed of a single vertical groove and indentations added to the upper and lower ends thereof each having a slightly larger diameter than the width of the vertical groove.

The safety valve 6, without being formed in the groove shape as described hitherto, may be also formed by bonding a metallic plate on an opening hole formed in the case body 3a and cover plate 3b by laser welding so that the opening hole is sealed, or attaching a pressure valve of an elastic material to the opening hole.

In the above embodiment, although the present invention was applied to the nonaqueous electrolytic secondary cell 1, it may be applied to any cell as long as it has a winding type power generating element 2 provided with the safety valve. Further, in the above embodiment, the present invention was applied to the elliptic cylindrical type of a cell, it may be applied to a cylindrical type of a cell. Further, in the above embodiment, although the safety valve 6 was attached to only the lower end of the side wall of the cell, it may be attached to the upper end of the side wall. In this case, the safety valve on the cover plate 3b is not required. Further, where the upper end surface of the battery is closed, the safety valve 6 may be provided at only the upper end of the side wall of the battery.

In the above embodiment, although the cell case 3 was composed of the case body 3a and cover plate 3b, it should not be limited to such a structure, but may have any optional structure.

As apparent from the description hitherto made, in the cell according to the present invention and a battery using such a cell, the safety valve is formed at the end of the side wall of the cell case. Therefore, even where the end surface of the cell is blocked, the gas generated within the cell case can be smoothly discharged externally.

What is claimed is:

1. A cell comprising:
   a winding type power generating element;
   a cell case for housing the winding type power generating element therein; and
   a safety valve extending from a position inclusive of a tip end of a mixture-applied area of at least one electrode of the power generating element on a side wall of the cell case along a winding axis direction of the power generating element, to a position beyond a tip end of a mixture-applied area of the other electrode of the power generating element in the winding axis direction;
   wherein the tip end of the mixture-applied area of each electrode is spaced apart from a bottom of the cell case.

2. The cell case according to claim 1, wherein a height of the cell along its side wall is 1.5 times or more as large as the most narrow width of the cell case.

3. A cell comprising:
   a winding type power generating element;
   a cell case for housing the winding type power generating element therein; and
   a safety valve formed at a position inclusive of a tip end of a mixture-applied area of at least one electrode of the power generating element on a side wall of the cell case along a winding axis direction of the power generating element,
   wherein the winding type power generating element is an elliptic-cylindrical winding type power generating element;
   the cell case is an elliptic-cylindrical cell case; and
   the safety valve is formed on an elliptic-cylindrical curved surface of the side wall of the cell case.

4. The cell case according to claim 2, wherein a height of the cell along its side wall is 1.5 times or more as large as the most narrow width of the cell case.

5. A battery comprising a plurality of the cells according to any one of claims 1 to 3 and 9, wherein each of the cells are arranged with the tip end located proximate a bottom side of the cell case, and a cooling plate is arranged on the bottom sides of the cell cases and between adjacent cells.

6. A cell comprising:
   a cell case comprising two flat large-dimensional side walls and two small-dimensional side walls;
   a winding type power generating element provided in-the cell case; and
   a safety valve formed in the side wall of the cell case;
   wherein the safety valve is located in one of the small-dimensional side walls along a winding axis direction of the power generating element, such that the safety valve superposes over a tip end of a mixture-applied area of at least one electrode of the power generating element, and extends to a position beyond a tip end of a mixture-applied area of the other electrode of the power generating element in the winding axis direction;
   wherein the tip end of the mixture-applied area of each electrode is spaced apart from a bottom of the cell case.

7. The cell according to claim 5, wherein the one small dimensional side wall has a curved portion in which the safety valve is provided.

8. The cell case according to claim 5, wherein a height of the side wall is 1.5 times or more as large as the narrowest width of the cell case.

9. A battery comprising a plurality of the cells according to any one of claims 5 to 7, wherein each of the cells are arranged with the tip end located proximate a bottom side of the cell case, and a cooling plate is arranged on the bottom sides of the cell cases and between adjacent cells.

* * * * *

UNITED STATES PATENT AND TRADEMARK OFFICE
CERTIFICATE OF CORRECTION

PATENT NO.   : 6,432,572 B1
DATED        : August 13, 2002
INVENTOR(S)  : Hiroaki Yoshida, Takefumi Inoue and Hideki Masuda It is certified that error appears in the above-identified patent and that said Letters Patent is hereby corrected as shown below:

Column 8,
Line 41, change "claim 2" to -- claim 3 --;
Line 45, change "claims 1 to 3 and 9" to -- 1-4 --;
Line 65, change "claim 5" to -- claim 6 --;

Column 9,
Line 1, change "claim 5" to -- claim 6 --; and
Line 5, change "claims 5 to 7" to -- claim 6 to 8 --.

Signed and Sealed this

Fifteenth Day of July, 2003

JAMES E. ROGAN
*Director of the United States Patent and Trademark Office*